United States Patent [19]

Musselman et al.

[11] 3,912,530
[45] Oct. 14, 1975

[54] WATER RESISTANT CORRUGATING ADHESIVE COMPOSITION

[75] Inventors: Camillus B. Musselman, Chesterfield; Edward M. Bovier, St. Louis County, both of Mo.

[73] Assignee: Anheuser-Busch, Incorporated, St. Louis, Mo.

[22] Filed: June 7, 1974

[21] Appl. No.: 477,325

Related U.S. Application Data

[63] Continuation-in-part of Ser. No. 264,868, June 21, 1972, abandoned.

[52] U.S. Cl. ............... 106/213; 161/125; 260/17.2
[51] Int. Cl.² ...................... C09D 3/20; C08L 3/02
[58] Field of Search.................... 106/213; 260/17.2

[56] References Cited
UNITED STATES PATENTS
3,155,527  11/1964  Mentzer.............................. 106/213

Primary Examiner—Theodore Morris
Attorney, Agent, or Firm—Gravely, Lieder & Woodruff

[57] ABSTRACT

This disclosure relates to a water resistant adhesive composition for use in the manufacture of corrugated board and its preparation. The adhesive is prepared by using a thin boiling or modified waxy variety starch of a fluidity of at least 25 as a component in the gelatinized carrier portion of the adhesive. This produces a high solids carrier which results in a final adhesive of good stability whose use enables corrugated board to be produced at faster than normal rates. This adhesive is particularly useful to increase production rates of heavy weight and multiwall board.

5 Claims, 1 Drawing Figure

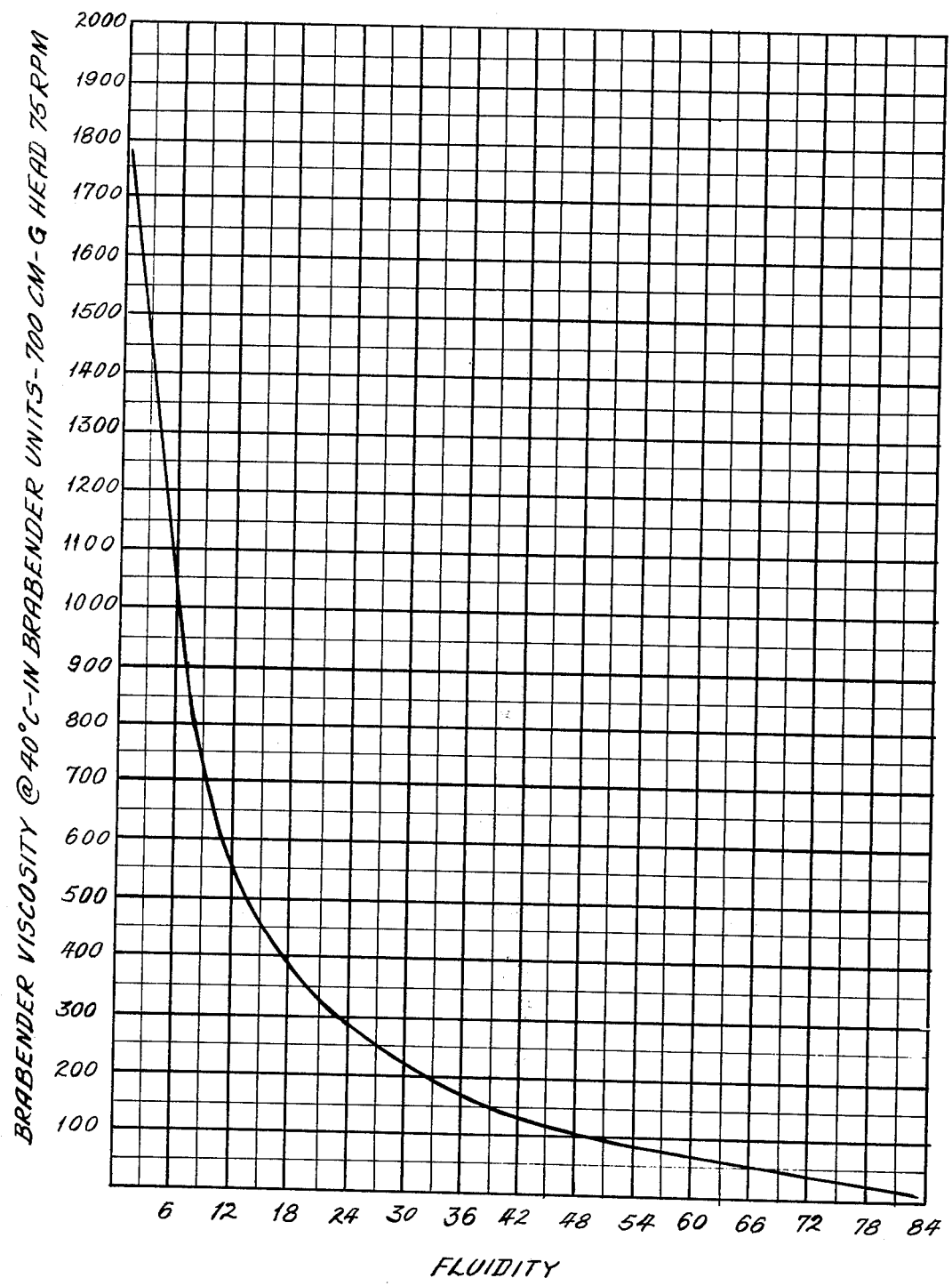

WATER RESISTANT CORRUGATING ADHESIVE COMPOSITION

REFERENCE TO PRIOR APPLICATIONS

This application is a continuation-in-part of application Ser. No. 264,868, filed June 21, 1972 (now abandoned) and co-pending application Ser. No. 371,040, filed June 18, 1973 (now abandoned).

BACKGROUND OF THE INVENTION

The use of water resistant corrugated paperboard for packaging has increased tremendously in the last several years. Accompanying this increased usage has been the demand for stronger and more specialized products to withstand more rigorous conditions. This demand has been met by the corrugated board industry by furnishing multiwall and heavy weight corrugated paperboard.

However, when such products are manufactured by the corrugators, the production rate is much lower than when single faced or double faced paperboard is being produced. Thus, the equipment is operating much less efficiently when such products are being made. The vast majority of water resistant corrugating operations are carried out using starch-based adhesives containing ureaformaldehyde, resorcinol-formaldehyde, or ketone-formaldehyde or other water proofing reagents to glue the various plies of paper or paperboard together. Such a standard water resistant corrugating adhesive is usually made by first cooking a portion of the starch with alkali to form a gelatinized phase called the carrier, which is then blended with uncooked starch (the raw portion). Most standard water resistant corrugating adhesives utilize unmodified starches for the carrier and raw portions. However, the use of slightly acid modified starches having a fluidity in the 4 – 10 range has been practiced as set forth in the patent of Merle J. Mentzer assigned to Corn Products Co., bearing U.S. Pat. No. 3,155,527. The water proofing agent can be added to the final mix or can be added in parts to the mix as it is being prepared and reacted in situ.

The carrier serves as a suspending agent for the uncooked starch. These adhesives require heat to gelatinize the raw starch to activate it as a bonding agent and to remove the water from the adhesive film in order for the plies to adhere to each other. When making multiwall board or board having especially heavy liners, the heat transfer rate to the adhesive is reduced substantially by the insulating effect of the paper.

It is the principal object of this invention to provide a water resistant adhesive composition which allows the production of multiwall and heavy weight corrugated paperboard at greater rates than presently attainable.

SUMMARY OF THE INVENTION

This invention relates to the preparation of a water resistant adhesive composition having a modified waxy starch of greater than 25 fluidity in the gelatinized solids of the carrier. This adhesive allows for faster than presently attainable speeds in the production of corrugated board in general, and multiwall and heavy weight corrugated board in particular.

DETAILED DESCRIPTION

The composition is prepared by using a waxy variety starch as a component of a high solids carrier in a starch-based corrugating adhesive formulation.

The waxy variety starch can be derived from waxy maize, waxy sorghum, or any species yielding a high (95-100%) amylopectin content starch. A waxy variety starch is used because this generic type, when gelatinized, does not set back or congeal as most other varieties do.

The waxy starch must be modified to make it less viscous so that the cooked solids portion can be increased without affecting the viscosity of the finished adhesive. Such chemical treatments include acid-modification, oxidation, enzyme treatment, chemical derivatization, e.g., starch ethers or starch esters, and combinations thereof. Also, modified includes thermal modifications, such as dextrinizing and autoclaving. The waxy starch is modified to a fluidity of 25 or greater.

The modified waxy starch has the following physical and chemical characteristics:

inherent viscosity of 0.2 to 2 deciliter/gram at 77°F. and 0.5% concentration as described in Standard Analytical Methods of the Corn Industries Research Foundation.

Solubility of 0.1 to 100% at 77°F.

Gelatinization temperature of 75°F. to 180°F.

Alkaline fluidity of 25 to 90 mls measured at 25°C. as described in "Chemistry and Industry of Starch" 2nd edition, R. W. Kerr, Academic Press N.Y., p. 133.

It is critical that the waxy starch have a fluidity of at least 25 as shown in the following Table I where Brabender viscosity is tabulated for waxy starches of various fluidity. This viscosity data at 40°C. is plotted against fluidity in the accompanying FIGURE and the slope of the curve shows a sharp break at a fluidity between 20 and 25. Table II shows the relationship of the fluidity range and the slope of the curve in that range. Thus, it is clear that at a fluidity of 20 or below a slight change in fluidity has a great effect on the waxy starch viscosity, whereas at a fluidity of 25 or higher, changes in fluidity result in very slight changes in viscosity of the waxy starch.

TABLE I

| | Brabender Data — 15% D.S., In Brabender Units — 700 cm.-g. Head, 75 RPM | | | | | | | |
|---|---|---|---|---|---|---|---|---|
| Sample | Fluidity | %H$_2$O | Gel °C. | Peak | 92.5°C | 20 min. | 40°C. | 25°C. |
| 1 | 0 | 10.6 | 68 | 3000 | 1860 | 1315 | 1770 | 2145 |
| 2 | 15 | 10.0 | 66.5 | 850 | 245 | 160 | 440 | 640 |
| 3 | 20 | 10.2 | 68.5 | 680 | 180 | 135 | 360 | 560 |
| 4 | 30 | 10.2 | 68 | 290 | 105 | 90 | 215 | 315 |
| 5 | 50 | 12.0 | 69 | 120 | 50 | 40 | 110 | 170 |
| 6 | 80 | 10.8 | 70.5 | 10 | 10 | 10 | 20 | 30 |

TABLE II

| Fluidity Range | | Slope of Curve in that Range |
|---|---|---|
| 0–5 | | –135 |
| 5–10 | | –84 |
| 10–15 | | –45 |
| 15–20 | | –20 |
| 20–25 | Break pt. on curve | –16 |
| 25–30 | | –12 |
| 30–35 | | –8 |
| 35–40 | | –6 |
| 40–50 | | –4 |
| 50–60 | | –4 |
| 60–70 | | –3.5 |
| 70–80 | | –2.5 |

The total solids of the final adhesive is between about 10 to about 40% of the weight of the final adhesive mix. The viscosity of the final adhesive mix is between about 16 seconds and about 120 seconds as measured in a standard brass cup test at 105°F. The standard brass cup test is described in Preparation, Circulation, and Storage of Corrugating Adhesives, S.T.A.P. No. 3 prepared by The Technical Association of the Pulp and Paper Industry.

The percent of cooked or carrier starch solids in the final mix is between about 3 and about 12% of the final adhesive mix and preferably is above 4%. Of this, 25 to 100% is gelatinized waxy starch solids. The amount of raw starch solids in the final mix is between about 10 and about 35% of the final adhesive mix.

Between about 1 and about 20%, by weight of the starch, of a material or materials capable of reacting with the starch to make it water resistant is used in the composition.

Suitable waterproofing materials that can be used with this invention include: urea formaldehyde resin, resorcinol-formaldehyde resin, ketone-formaldehyde resin, phenol-aldehyde resin, and mixtures thereof.

Other materials that can be used with this invention include: urea with formaldehyde, resorcinol with formaldehyde, calcium cyanamide with formaldehyde, a phenolic compound with an aldehyde compound, and a phenolic compound with an oxazolidine compound. These combinations can be added to the composition as it is being prepared and reacted in situ.

Between about 0.01 and about 1.0% by weight borax can be used, based on the weight of the final adhesive mix.

The final adhesive contains about 0.01 to about 1.0% caustic (NaOH) by weight based on the weight of the adhesive.

From about 60 to about 85.9% water by weight is in the final adhesive mix.

In preparing the primary mix (as will be described in more detail in the examples which follow), the mixing water is at about 70°F. to about 130°F. and raw corn starch, modified waxy corn starch and sodium hydroxide are added. The mix is heated to about 130°F. to about 185°F., preferably 160°F., for about 5 to about 30 minutes to gelatinize the starches. Water is added and the mix stirred for about 5 to about 15 minutes.

The secondary mix is prepared by mixing raw corn starch and borax with water. The primary mix is added to the secondary mix over a period of about 10 to about 60 minutes, preferably 30 minutes.

The final adhesive has a viscosity of about 16 seconds to about 120 seconds at 105°F.

The adhesive composition can be prepared by adding an additional amount of cooked solids in the form of a gelatinized waxy starch to a standard water resistant corrugating adhesive, or by including a gelatinized waxy starch as a component in the preparation of the cooked carrier portion so as to increase the amount of cooked solids in that portion.

The following examples are set forth to illustrate methods of preparing adhesive compositions of this invention to one skilled in the art and they are not intended to be restrictive, but merely to be illustrative of the invention herein contained.

EXAMPLE 1

This is an example of a one tank mix using a ketone-formaldehyde resin (APC 6010 sold by Anheuser-Busch, Incorporated). In a mixer are placed 250 gallons of water at 120°F., 300 lbs. of 85 fluidity thin-boiling waxy maize starch, 150 lbs. of pearl corn starch, and 68 lbs. of a 50% solution of sodium hydroxide. This mixture is heated to 145°F. and agitated for 20 minutes. This treatment causes the starch to gelatinize. To this mixture is added 7 lbs. of borax pentahydrate and 300 gallons of cold water. This is thoroughly mixed into the gelatinized starch mixture and 1250 lbs. of pearl corn starch are added. The product is thoroughly mixed until smooth. To this is added 14 lbs. of borax pentahydrate and 60 lbs. of ketone-formaldehyde resin (APC 6010). These additives are thoroughly mixed into the starch. This starch adhesive when employed as a corrugating adhesive gives excellent adhesion and good water resistance. In addition, the corrugator, which has a speed with normal water resistant adhesives and heavy board of 280 ft./min., gives a rate of 350 ft./min. with this adhesive using the waxy maize starch.

EXAMPLE 2

This is an example of a two-tank mix using urea-formaldehyde resin. All of the parts are by weight.

Carrier Portion

In a mixer are placed 380 parts of water, 45 parts of pearl corn starch, 136 parts of 85 fluidity thin-boiling waxy maize starch and 29 parts of a 50% solution of sodium hydroxide. This slurry is heated to 160°F. and agitated for 15 minutes before 227 parts of cold water are mixed into the product.

Raw Product

In another mixer are added 1520 parts of water, 14 parts of borax decahydrate and 544 parts of pearl corn starch. The mixture is agitated to thoroughly mix the components.

Final Mix

The carrier portion is slowly added to the raw portion over a period of 30 minutes and mixed well. To the mixture is added 31 parts of urea-formaldehyde resin (Casco WS-85-101-1 made by Borden). This mixture is thoroughly mixed, and when employed as a corrugating adhesive, excellent adhesion and good water resistance is obtained.

EXAMPLE 3

This is an example of a two-tank mix using calcium cyanamide and formaldehyde. The carrier portion and the raw portion are made and mixed together as set forth in Example 2. To the mixed carrier and raw portions is added 15.4 parts of calcium cyanamide and 14 parts of a 37% solution of formaldehyde. The final mix is thoroughly mixed to produce a corrugating adhesive which gives excellent adhesion and very good water resistance when used to combine corrugated board.

EXAMPLE 4

This is an example of a two-tank mix using resorcinol-formaldehyde as a water resistant material.

Carrier Portion

In a mixer are added 190 parts of water, 32 parts of pearl corn starch, 13 parts of resorcinol, 68 parts of 85 fluidity thin-boiling waxy maize starch and 14.5 parts of a 50% solution of sodium hydroxide. This mixture is heated to 155°F. with agitation for a period of 10 minutes to gelatinize the starch, before 123 parts of cold water are mixed in to form the product.

Raw Portion

To 570 parts of water in another mixer are added 272 parts of pearl corn starch.

Final Mix

The carrier portion is slowly added to the raw portion with mixing for a period of 30 minutes. To this is added 20.6 parts of a 37% solution of formaldehyde. When a brass cup viscosity increases to 30 seconds, an additional 190 parts of water are added. This product, when employed as a corrugating adhesive, gives excellent adhesion and excellent water resistance.

EXAMPLE 5

This is an example of a one-tank mix using resorcinol-formaldehyde as the water resistant material. In a mixer are placed 100 gallons of water at room temperature, 150 lbs. of 85 fluidity thin-boiling waxy maize, 90 lbs. of pearl corn starch, and 37 lbs. of resorcinol. This mixture is agitated for 5 minutes, and then heated to 140°F. and agitated for 10 minutes at that temperature. To the mixture are added 28 lbs. of a 50% solution of sodium hydroxide and this is agitated for 15 minutes. With thorough mixing after each addition, 100 gallons of water at room temperature, 510 lbs. of pearl starch and 20 lbs. of paraformaldehyde are added. The adhesive is allowed to age 1 hour with mixing. This starch adhesive, when employed as a corrugating adhesive, gives excellent adhesion and good water resistance. In addition, the speed of the corrugator is increased by 75–100 ft./min. when this adhesive is used as compared to an adhesive which does not use thin-boiling waxy maize starch.

What is claimed is:

1. A water resistant adhesive suitable for making heavy weight and multiwall board at faster than normal rates comprising:
    a. about 3 to about 12% gelatinized starch solids of which about 25 to 100% is waxy starch modified to increase the fluidity thereof to the range of 25 to about 90 mls measured at 25°C.,
    b. about 10 to about 35% raw starch solids,
    c. about 0.1 to about 1.0% NaOH,
    d. about 1 to about 20% of a water resistant material by weight of the starch, and
    e. about 60 to about 85.9% water, said percent being by weight based on the final adhesive mix, the amount of gelatinized starch solids being such as to provide an increased amount of cooked starch solids as compared with conventional corrugating adhesives, the viscosity of said adhesive being 16 to 120 seconds on the brass cup at 105°F., and the waxy starch being modified to allow said increased amount of cooked solids while retaining the viscosity of the adhesive.

2. The composition of claim 1 in which about 0.1 to about 1.0% borax is present.

3. The composition of claim 1 having about 10% to about 40% total solids by weight.

4. The composition of claim 1 wherein the waxy starch has a solubility of 0.1 to 100% at 77°F., an inherent viscosity of 0.1 to 2 deciliter/gram at 0.5% concentration at 77°F.

5. The adhesive of claim 1 wherein the water rsistant material is selected from the group consisting of urea-formaldehyde resin, resorcinol-formaldehyde resin, phenol-aldehyde resin, mixtures therof, urea with formaldehyde, resorcinol with formaldehyde, calcium cyanamide with formaldehyde, a phenolic compound with an aldehyde compound, and a phenolic compound with an oxazolidine compound.

* * * * *